US006966600B2

(12) United States Patent
Moriyama

(10) Patent No.: US 6,966,600 B2
(45) Date of Patent: Nov. 22, 2005

(54) SIDE DOOR STRUCTURE OF VEHICLE

(75) Inventor: Yukihiro Moriyama, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/700,464

(22) Filed: Nov. 5, 2003

(65) Prior Publication Data

US 2004/0088823 A1 May 13, 2004

(30) Foreign Application Priority Data

Nov. 5, 2002 (JP) ............................ 2002-321644

(51) Int. Cl.[7] .................................................. B60J 5/00
(52) U.S. Cl. ............................ 296/146.1; 296/146.11; 296/155; 16/82
(58) Field of Search ............................ 296/146.1, 155, 296/14, 146.11; 292/262; 16/82

(56) References Cited

U.S. PATENT DOCUMENTS

| | | | | |
|---|---|---|---|---|
| 2,043,976 | A * | 6/1936 | Schonitzer | 16/82 |
| 2,880,029 | A * | 3/1959 | Allen | 16/82 |
| 2,915,777 | A * | 12/1959 | Allen | 16/82 |
| 2,915,778 | A * | 12/1959 | De Vito | 16/82 |
| 6,728,993 | B1 * | 5/2004 | Murayama | 16/82 |
| 6,813,811 | B2 * | 11/2004 | Matsuki et al. | 16/86 B |
| 2003/0037411 | A1 * | 2/2003 | Seo | 16/86 C |

FOREIGN PATENT DOCUMENTS

JP 2001-138864 5/2001

* cited by examiner

*Primary Examiner*—Lori L. Coletta
(74) *Attorney, Agent, or Firm*—Nixon Peabody LLP; Donald R. Studebaker

(57) ABSTRACT

A side door structure of a vehicle of which side openings are covered by a front door swingably supported by a door hinge located at the front of the front door and by a rear door swingably supported by a door hinge located at the rear of the rear door. The side door structure includes a door checker for holding the front door at an open position situated slightly on the outside of a swing trajectory of the rear door.

3 Claims, 13 Drawing Sheets

PRIOR ART

SIDE DOOR STRUCTURE OF VEHICLE

BACKGROUND OF THE INVENTION

1. Field of the Invention

The present invention relates to a side door structure applicable to a vehicle body of which side openings are covered by front doors swingably supported by door hinges located at the front of the front doors and by rear doors swingably supported by door hinges located at the rear of the rear doors.

2. Description of the Related Art

There exists a conventionally known side door structure of a vehicle of which front doors and rear doors covering side openings in a vehicle body are opened frontward and rearward, respectively, as described in Japanese Unexamined Patent Publication No. 2001-138864, for example. In this side door structure (hereinafter referred to as the two-way opening side door structure), the front doors are swingably supported by door hinges located at the front of the front doors and the rear doors are swingably supported by door hinges located at the rear of the rear doors so that they can be opened frontward and rearward, respectively.

The two-way opening side door structure of the vehicle disclosed in the above-cited Japanese Unexamined Patent Publication No. 2001-138864 is built as follows. When opening a rear door 4*a*, an occupant first undoes a door lock of a front door 2*a* and opens the front door 2*a* to a specific angle as shown by imaginary lines in FIG. 14 to release the front and rear doors 2*a*, 4*a* from their interlocked state. Then, the occupant swings the rear door 4*a* from a closed position to an open position.

Generally, upper portions of side doors (front and rear) of the vehicle are inwardly inclined as viewed from the front of the vehicle so that upper ends of the side doors are located more or less inward toward a center line of the vehicle body largely for design-related reasons. When the front and rear doors 2*a*, 4*a* of which upper portions are inwardly inclined are swingably supported by vertically mounted hinge pins 17*a* and 12*a*, respectively, as shown in FIG. 14, a rearmost part of the upper end of the front door 2*a* swings slightly rearward whereas a forwardmost part of the upper end of the rear door 4*a* swings slightly frontward in an initial stage of opening the respective doors 2*a*, 4*a*. This is because the upper ends of the front and rear doors 2*a*, 4*a* are positioned inward toward the center line of the vehicle body with respect to longitudinal axes of the hinge pins 17*a*, 12*a*.

In addition, the front and rear doors 2*a*, 4*a* are installed in such a manner that a rear end of the front door 2*a* and a front end of the rear door 4*a* overlap each other by a specific distance OL. Therefore, a swing trajectory of the rear end of the front door 2*a* and a swing trajectory of the front end of the rear door 4*a* produced as the respective doors 2*a*, 4*a* are opened and closed inevitably overlap over a large area "A" as illustrated (hatched in FIG. 14).

In this structure, the front end of the rear door 4*a* is apt to interfere with the rear end of the front door 2*a* when the rear door 4*a* is opened and, therefore, the occupant has to open the rear door 4*a* after widely opening the front door 2*a* to prevent this interference between the front and rear doors 2*a*, 4*a*. The conventional two-way opening side door structure has this problem concerning operational ease.

SUMMARY OF THE INVENTION

This invention is intended to solve the aforementioned problem concerning operational ease of a two-way opening side door structure. Accordingly, it is an object of the invention to provide a two-way opening side door structure of a vehicle capable of holding a rear door at a specific angle in a stable fashion with a simple construction.

A side door structure of the invention is applicable to a vehicle of which side openings are covered by a front door swingably supported by a door hinge located at the front of the front door and by a rear door swingably supported by a door hinge located at the rear of the rear door. The side door structure includes a door checker for holding the front door at an open position situated on the outside of but close to a swing trajectory of the rear door.

The door checker of this side door structure holds the front door at the open position situated slightly on the outside of the swing trajectory of the rear door. This structure effectively prevents a front end of the rear door from interfering with a rear end of the front door when an occupant opens the rear door.

These and other objects, features and advantages of the invention will become more apparent upon reading the following detailed description along with the accompanying drawings.

DETAILED DESCRIPTION OF THE PREFERRED EMBODIMENTS OF THE INVENTION

Figure 1:
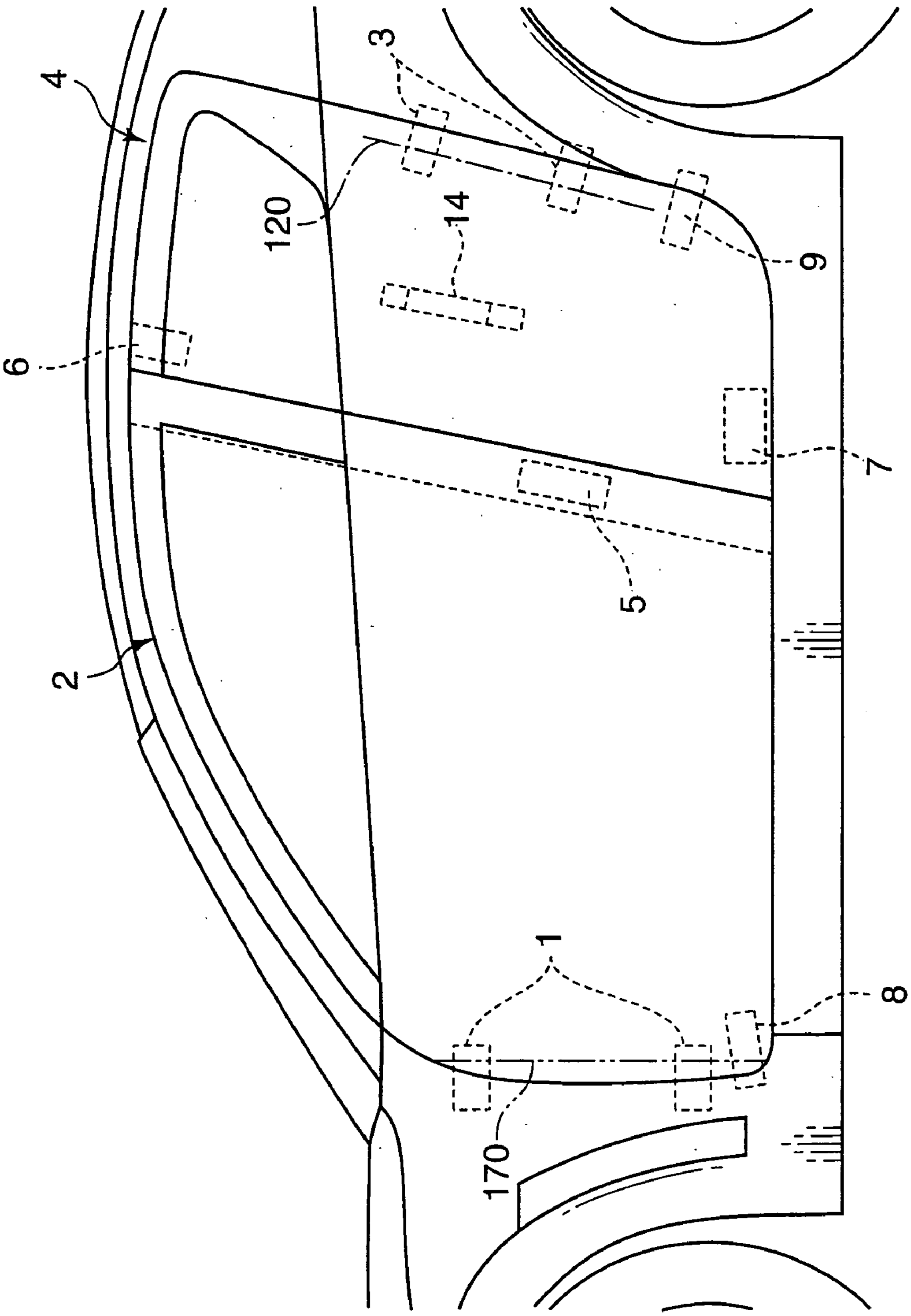
FIG. 1 is a side view showing a side door structure of a vehicle according to a specific embodiment of the invention.
Figure 2:
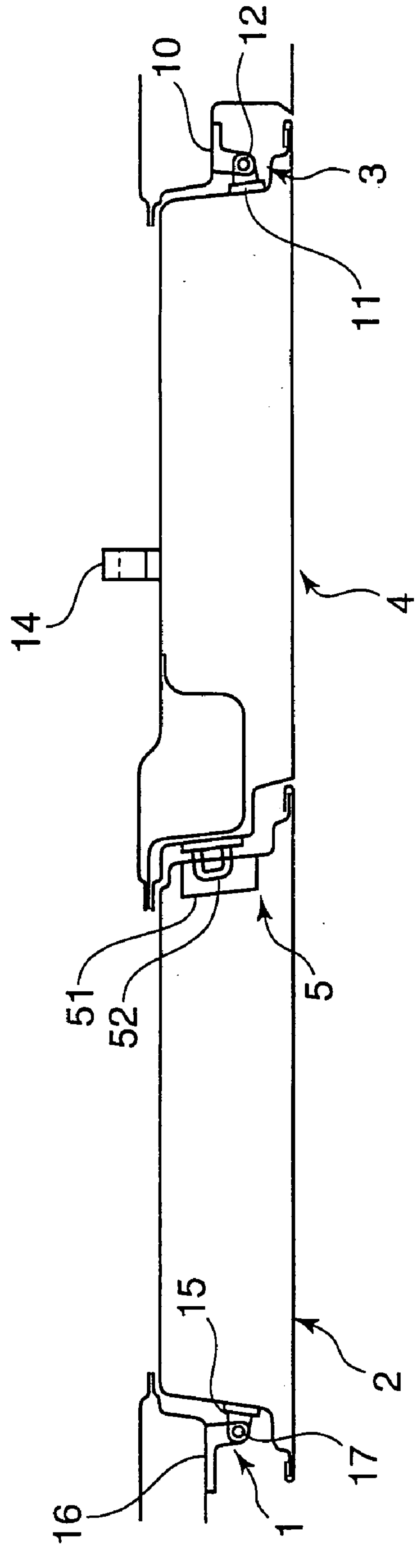
FIG. 2 is a plan view showing the side door structure of FIG. 1.

FIGS. 1 and 2 are diagrams showing a side door structure of a vehicle according to a specific embodiment of the invention. The side door structure includes left and right front doors 2 each supported by a pair of upper and lower door hinges 1 located at their front ends and left and right rear doors 4 each supported by a pair of upper and lower door hinges 3 located at their rear ends. The front and rear doors 2, 4 covering front and rear openings formed in both side walls of a vehicle body can be swung about the respective door hinges 1, 3 between their closed and open positions. More specifically, the side door structure of the embodiment is a two-way opening side door structure in which the front doors 2 are opened frontward and the rear doors 4 are opened rearward.

The front door 2 on each side of the vehicle is retained in the closed position as it is interlocked with the rear door 4 by a door lock 5 which includes a door latch 51 provided at a rear end of the front door 2 and a striker 52 provided at a front end of the rear door 4. On the other hand, the rear door 4 on each side of the vehicle is retained in the closed position by a pair of upper and lower door locks 6, 7 provided between the rear door 4 and the vehicle body. There is provided a door checker 8 at a lower front position of the front door 2 for holding the front door 2 at a fixed position when it has reached a specific opening angle. Likewise, there is provided a door checker 9 at a lower rear position of the rear door 4 for holding the rear door 4 at a fixed position when it has reached a specific opening angle.

Figure 3:
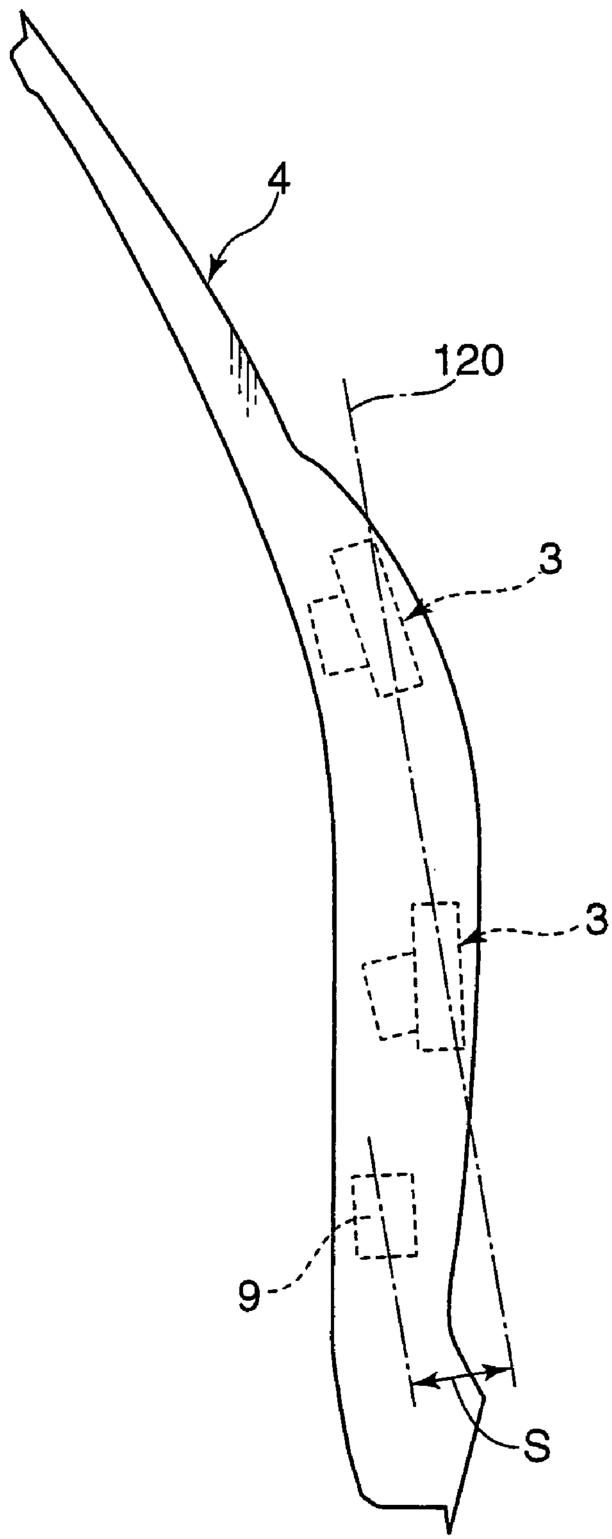
FIG. 3 is an explanatory diagram showing how a rear door is supported as viewed from the front of the vehicle.

The door hinges 3 supporting the rear door 4 each include a metallic hinge leaf 10 affixed to a rear wall surface of the rear door 4, a metallic hinge leaf 11 affixed to a rear side of a peripheral surface of the rear opening formed in the vehicle body, and a hinge pin 12 joining the hinge leaves 10, 11. A vehicle occupant can open and close the rear door 4 while holding an inner door handle 14 located a specific distance rearward from the front end of the rear door 4. The rear door 4 swings between its closed and open positions about the hinge pins 12 of the upper and lower door hinges 3. The upper and lower door hinges 3 are mounted in such a way that an axis line 120 of each hinge pin 12 is inclined sideways as viewed from the front of the vehicle so that an upper end of each hinge pin 12 is located slightly inward toward a center line of the vehicle body as shown in FIG. 3 and the axis line 120 of each hinge pin 12 is inclined so that the upper end of each hinge pin 12 is located slightly to the rear of the vehicle body in side view as shown in FIG. 1.

Likewise, the door hinges 1 supporting the front door 2 each include a metallic hinge leaf 15 affixed to a front wall surface of the front door 2, a metallic hinge leaf 16 affixed to a frontal part of a peripheral surface of the front opening formed in the vehicle body, and a hinge pin 17 joining the hinge leaves 15, 16. The front door 2 swings between its closed and open positions about the hinge pins 17 of the upper and lower door hinges 1. Like the door hinges 3 of the rear door 4, the upper and lower door hinges 1 supporting the front door 2 are mounted in such a way that an axis line 170 of each hinge pin 17 is inclined sideways as viewed from the front of the vehicle so that an upper end of each hinge pin 17 is located slightly inward toward the center line of the vehicle body and the hinge pin 170 of each hinge pin 17 is oriented generally vertically in side view as shown in FIG. 1.

Figure 4:
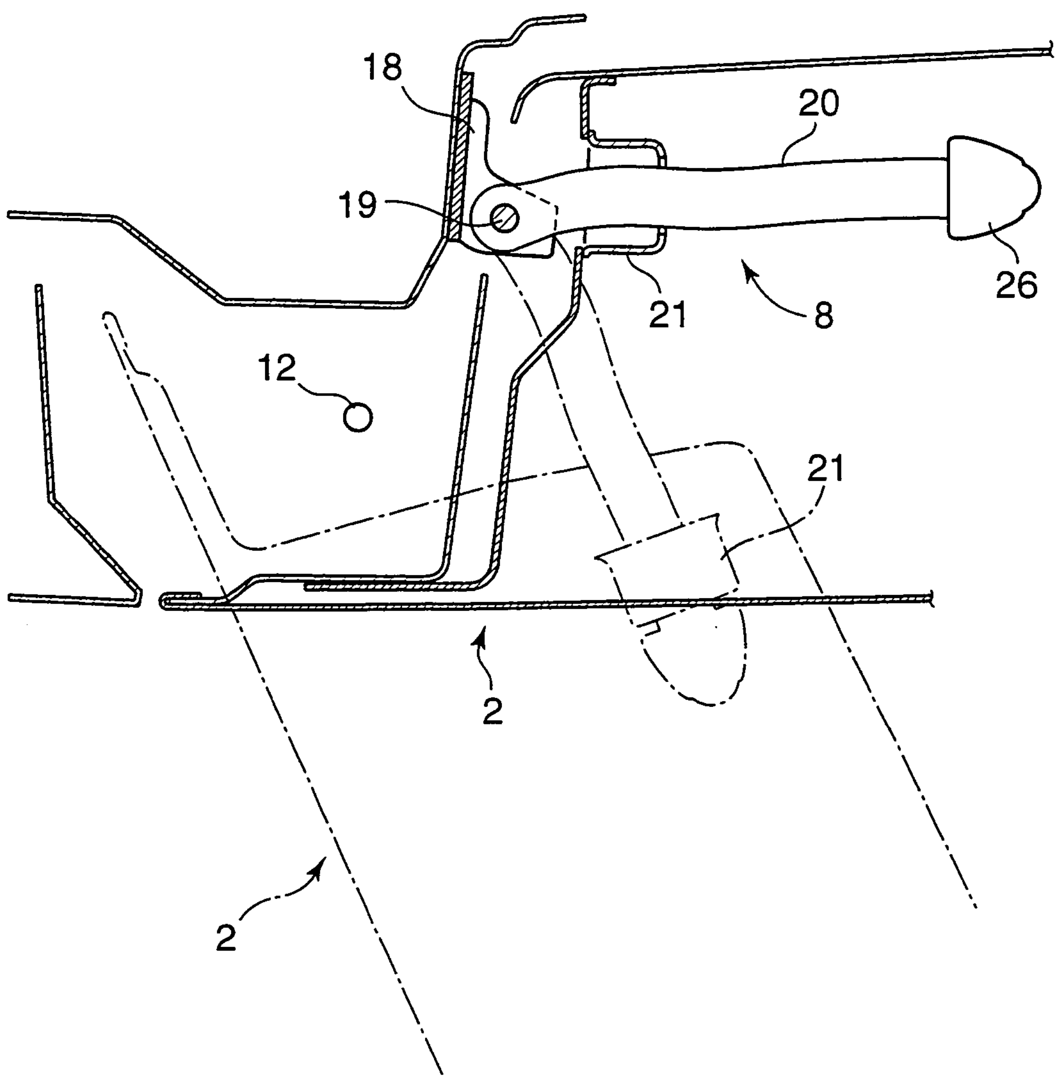
FIG. 4 is a sectional plan view showing a specific construction of a door checker for a front door.
Figure 5:
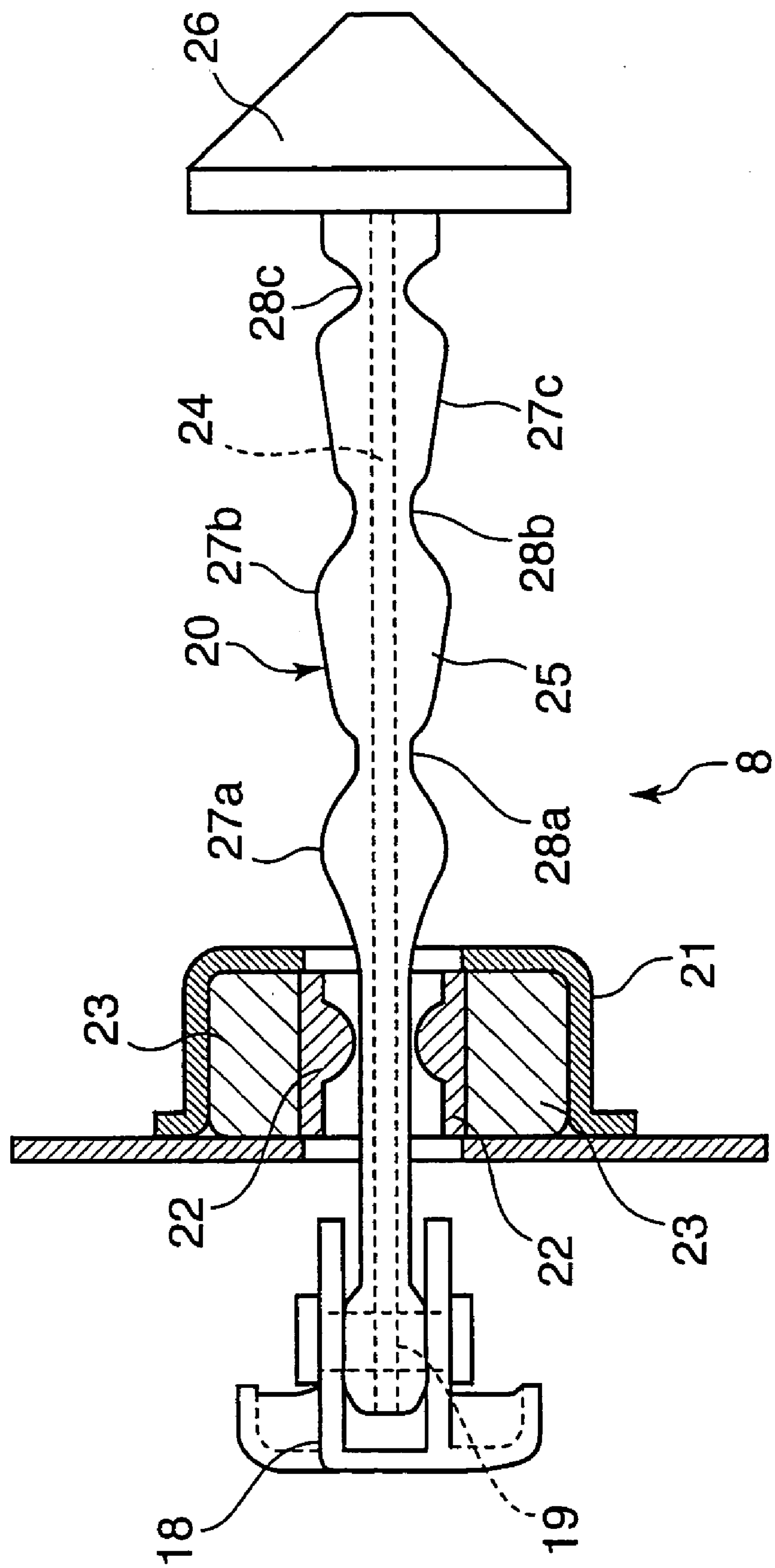
FIG. 5 is a sectional side view showing the construction of the door checker for the front door.

The door checker 8 for the front door 2 includes a bracket 18 attached to the vehicle body at a position facing the front wall surface of the front door 2, a checker plate 20 supported swingably about a support pin 19 fitted in the bracket 18, and a boxlike holder 21 affixed inside a frontal part of the front door 2 as shown in FIG. 4. The holder 21 contains a pair of upper and lower clamping parts 22 and a pair of elastic members 23 forcing the upper and lower clamping parts 22 toward each other as shown in FIG. 5.

The checker plate 20 has a core 24 made of a steel plate, for example, a sheathing 25 made of synthetic resin covering the core 24 and a stopper 26 provided at an extreme end of the checker plate 20. When the checker plate 20 is set in position through a hole in the holder 21 as illustrated, the upper and lower clamping parts 22 grasp the checker plate 20 from both top and bottom sides of the checker plate 20 due to biasing forces exerted by the elastic members 23. The thickness of the checker plate 20 is varied along a longitudinal direction of the checker plate 20 so that there are formed alternate protruding portions (protuberances) 27*a*, 27*b*, 27*c* and narrowed portions (recesses) 28*a*, 28*b*, 28*c* on the top and bottom sides of checker plate 20.

As the occupant opens or closes the front door 2, the holder 21 slides along the length of the checker plate 20. In the door checker 8 constructed as described above, the amount of friction of sliding exerted by the upper and lower clamping parts 22 on top and bottom surfaces of the checker plate 20 due to the biasing forces of the elastic members 23 varies with the opening angle of the front door 2.

The support pin 19 of the door checker 8 is located at a position offset inward toward the center line of the vehicle body by a specific distance from the location of the hinge pin 17 as shown in the plan view of FIG. 4. Therefore, as the occupant swings the front door 2 about the hinge pins 17 from the closed position shown by solid lines in FIG. 4 to the open position shown by dot-and-dash lines, and vice versa, the holder 21 moves together with the front door 2 and the checker plate 20 swings about the support pin 19 as shown by solid and dot-and-dash lines. Since a supporting point (or an axis line of the support pin 19) about which the checker plate 20 swings is offset from a supporting point (or an axis line of the hinge pin 17) about which the front door 2 swings as described above, the holder 21 shifts sliding along the length of the checker plate 20 when the occupant swings the front door 2.

When the holder 21 slides along the checker plate 20, the upper and lower clamping parts 22 contained in the holder 21 slide over the protuberances 27*a*, 27*b*, 27*c* toward the successive recesses 28*a*, 28*b*, 28*c* formed on the top and bottom surfaces of the checker plate 20. During this sliding process, sloping surfaces of the individual recesses 28*a*, 28*b*, 28*c* force the upper and lower clamping parts 22 upward and downward, compressing the upper and lower elastic members 23, respectively. Consequently, there occurs friction of sliding corresponding to the biasing forces exerted by the elastic members 23. The biasing forces of the elastic members 23 act in directions in which the upper and lower clamping parts 22 are caused to drop into the individual recesses 28*a*, 28*b*, 28*c*. Thus, when the clamping parts 22 have dropped into any pair of these recesses 28*a*, 28*b*, 28*c* and the front door 2 is not pushed further outward in its opening action, the upper and lower clamping parts 22 pushed by the elastic members 23 exert a particular restraining force on the checker plate 20, so that the front door 2 is kept at an opening angle corresponding to which recesses 28*a*, 28*b*, 28*c* the clamping parts 22 have dropped in.

Figure 6:
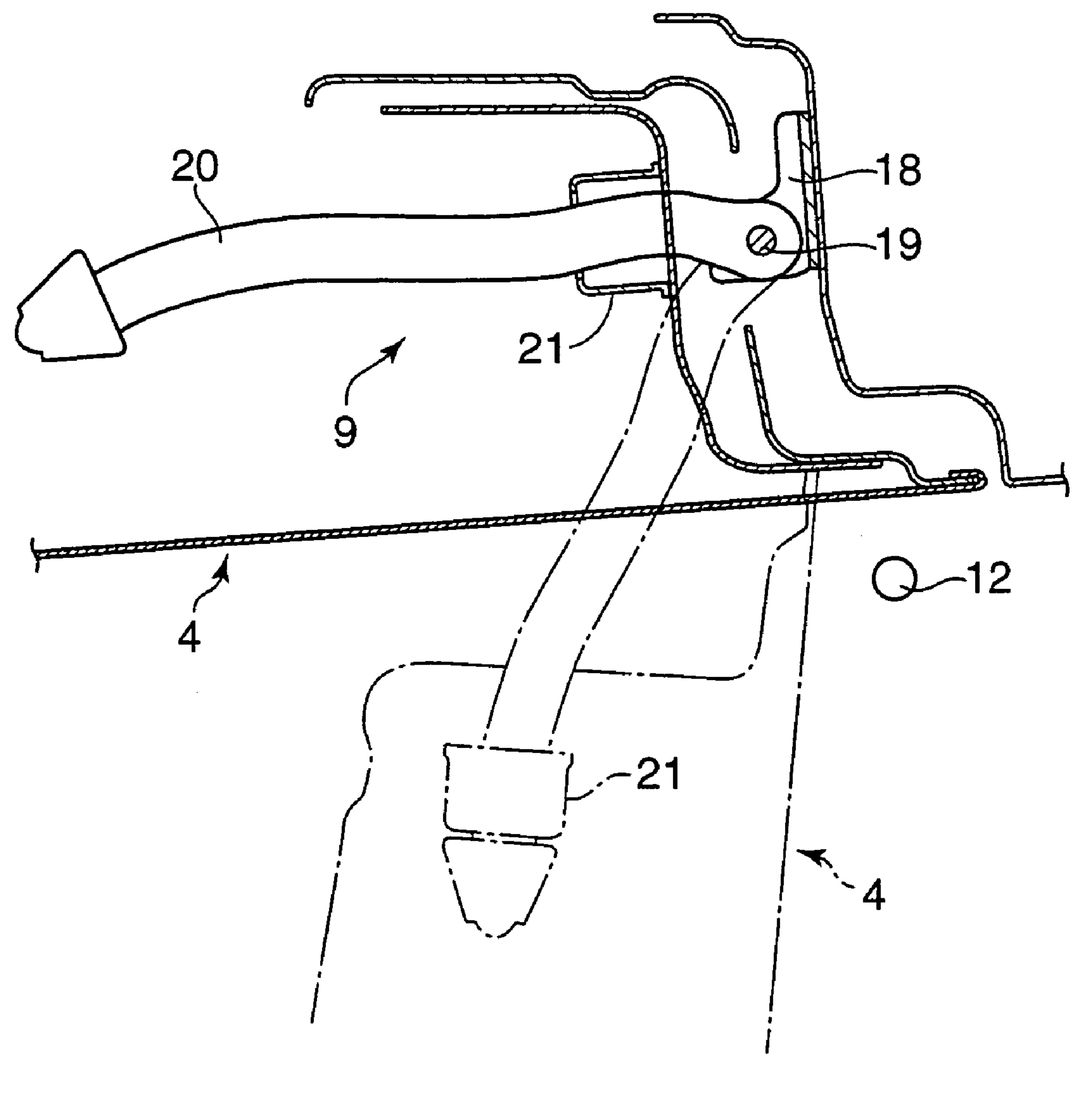
FIG. 6 is a sectional plan view showing a specific construction of a door checker for the rear door.
Figure 7:
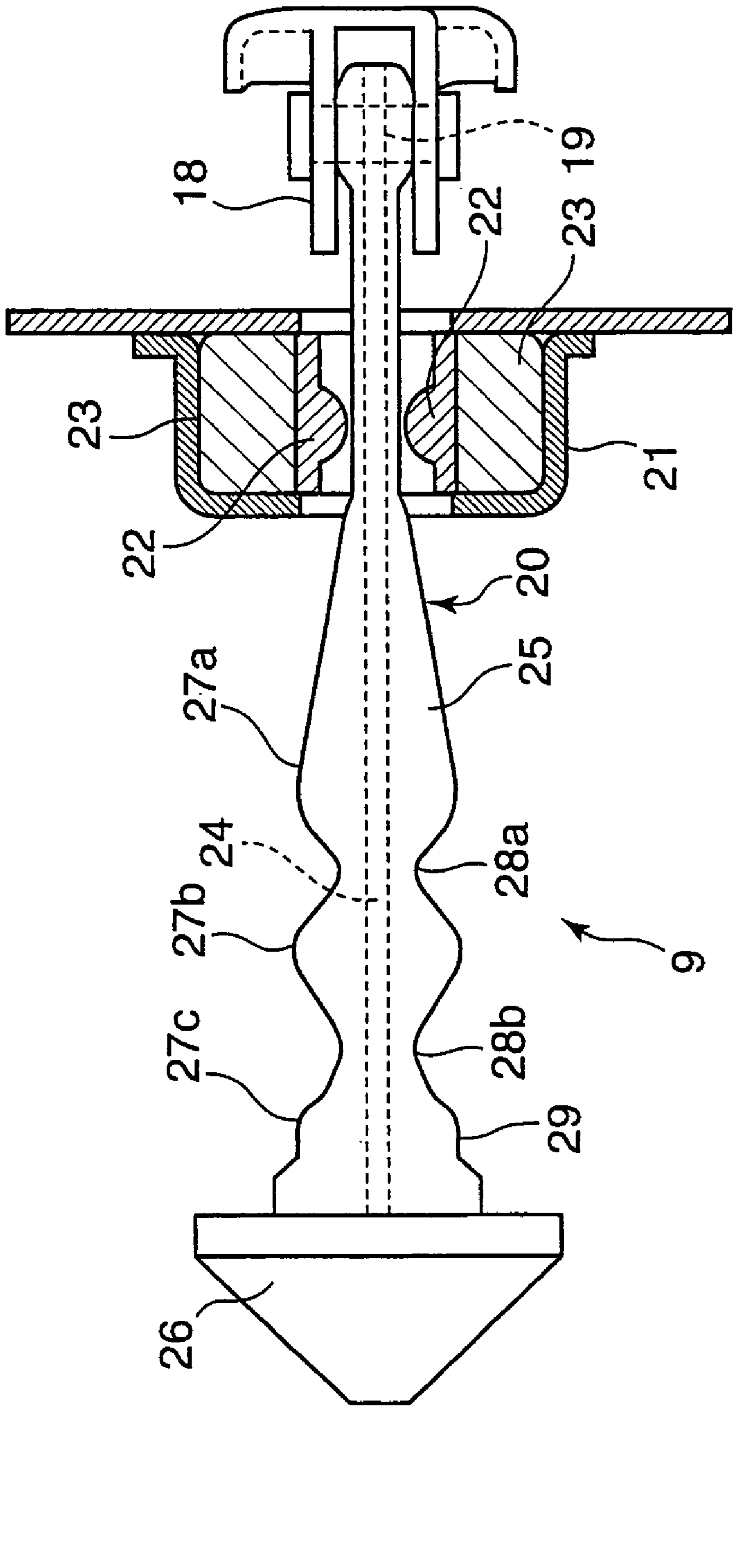
FIG. 7 is a sectional side view showing the construction of the door checker for the rear door.

Likewise, the door checker 9 for the rear door 4 includes a bracket 18 attached to the vehicle body at a position facing the rear wall surface of the rear door 4, a checker plate 20 supported swingably about a support pin 19 fitted in the bracket 18, and a boxlike holder 21 affixed inside a rear part of the rear door 4 as shown in FIG. 6. The holder 21 contains a pair of upper and lower clamping parts 22 and a pair of elastic members 23 forcing the upper and lower clamping parts 22 toward each other as shown in FIG. 7.

The checker plate 20 of the door checker 9 for the rear door 4 differs from the checker plate 20 of the door checker 8 for the front door 2 mainly in that a pair of protuberances 27*c* (upper and lower) formed close to an extreme end of the checker plate 20 widens toward a stopper 26 forming a large-diameter portion 29 at a terminal part of the checker plate 20 without forming any recesses 28*c*. The checker plate 20 of the door checker 9 for the rear door 4 is otherwise constructed generally in the same fashion as the checker plate 20 of the door checker 8 for the front door 2. Also, the door checker 9 for the rear door 4 functions in a similar way as the door checker 8 for the front door 2.

If an occupant on a rear seat intends to open the rear door 4 from the closed position, the occupant first undoes the door lock 5 to unlock the front door 2 and opens the front door 2 to a specific angle. Then, after releasing the upper and lower door locks 6, 7 of the rear door 4, the occupant opens the rear door 4 while holding the inner door handle 14 such that the front end of the rear door 4 swings outward from the vehicle body.

When the front and rear doors 2, 4 reach specific opening angles as they are being opened, the doors 2, 4 are held at the respective opening angles by restraining forces exerted by the door checkers 8, 9 on the respective doors 2, 4.

Figure 8:
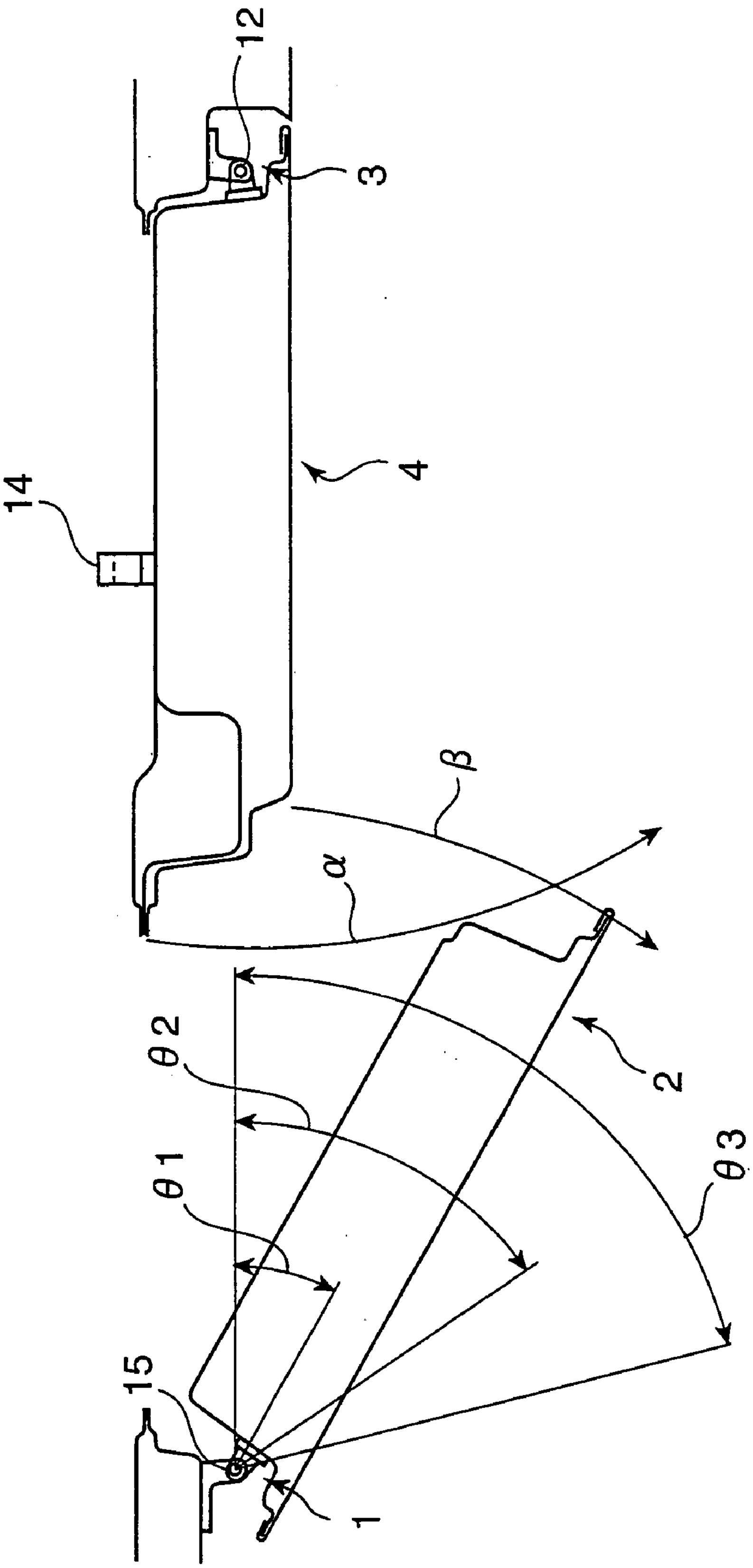
FIG. 8 is an explanatory diagram showing how the front door swings as it is opened and closed.

More specifically, the door checker 8 for the front door 2 is constructed such that when the front door 2 reaches a position of its minimum opening angle θ1 located slightly on the outside of a swing trajectory α of the front end of the rear door 4, the clamping parts 22 of the door checker 8 reach the location of the first recesses 28*a* (among the first to third recesses 28*a*, 28*b*, 28*c*) formed on the checker plate 20 of the door checker 8 closest to the support pin 19, whereby the front door 2 is held at the minimum opening angle θ1 as shown in FIG. 8. When the front door 2 is further opened and the clamping parts 22 reach the location of the second recesses 28*b* situated at about the middle of the length of the checker plate 20, the front door 2 is held at its medium opening angle θ2 which is convenient for a front seat occupant to get into and out of the vehicle. Then, when the front door 2 is further opened and the clamping parts 22 reach the location of the third recesses 28*c* situated near the extreme end of the checker plate 20, the front door 2 is held at its maximum opening angle θ3.

On the other hand, the door checker 9 for the rear door 4 is constructed such that when the rear door 4 reaches a position of its minimum opening angle located slightly on the outside of a swing trajectory β of the rear end of the front door 2, the clamping parts 22 of the door checker 9 reach the location of the first recesses 28*a* formed on the checker plate 20 of the door checker 9 closest to the support pin 19, whereby the rear door 4 is held at the minimum opening angle. When the rear door 4 is further opened and the clamping parts 22 reach the location of the second recesses 28*b* formed on the checker plate 20, the rear door 4 is held at its medium opening angle which is convenient for a rear seat occupant to get into and out of the vehicle. Then, when the rear door 4 is further opened and the clamping parts 22 reach the location of the large-diameter portion 29 situated near the extreme end of the checker plate 20, the rear door 4 is held at its maximum opening angle.

The aforementioned side door structure, in which the openings formed in each side wall of the vehicle body are covered by the front door 2 swingably supported by the upper and lower door hinges 1 located at the front end of the front door 2 and by the rear door 4 swingably supported by the upper and lower door hinges 3 located at the rear end of the rear door 4, is provided with the door checker 8 for holding the front door 2 in its open position which is located on the outside of but close to the swing trajectory a of the front end of the rear door 4 as shown in FIG. 8. This structure is advantageous in that the rear door 4 can be opened with ease and safety.

Before opening the rear door 4, the occupant slightly opens the front door 2 up to a point where the door checker 8 holds the front door 2 outside but close to the swing trajectory a of the front end of the rear door 4. As a result, the rear door 4 can be opened without interfering with the rear end of the front door 2. Therefore, the rear seat occupant can open the rear door 4 with ease and safety without the need to take such intricate and painstaking action as stretching out to the front door 2 and opening it unnecessarily widely when getting out of the vehicle.

In the present embodiment, the door checker 8 holds the front door 2 at three (first to third) positions. The first front door hold position at the minimum opening angle θ1 where the door checker 8 holds the front door 2 when the clamping parts 22 have reached the location of the first recesses 28*a* formed on the checker plate 20 of the door checker 8 closest to the support pin 19 is located on the outside of but close to the swing trajectory a of the front end of the rear door 4. In this structure, the door checker 8 holds the front door 2 at the position corresponding to the minimum opening angle θ1 when the occupant slightly opens the front door 2 before opening the rear door 4. This arrangement enables the occupant to open the rear door 4 without causing the front end of the rear door 4 to interfere with the rear end of the front door 2.

The second front door hold position where the door checker 8 holds the front door 2 when the clamping parts 22 have reached the location of the second recesses 28*b* at about the middle of the length of the checker plate 20 is located at a position corresponding to the medium opening angle θ2 convenient for the front seat occupant to get into and out of the vehicle, and the third front door hold position where the door checker 8 holds the front door 2 when the clamping parts 22 have reached the location of the third recesses 28*c* near the extreme end of the checker plate 20 is located at a position corresponding to the maximum opening angle θ3. This arrangement is advantageous in that the front seat occupant can easily get into and out of the vehicle with the front door 2 held at the medium opening angle θ2 of the front door 2 and luggage can be easily loaded into and unloaded from the vehicle interior with the front door 2 held at the maximum opening angle θ3.

While the door checker 8 holds the front door 2 at the three hold positions in this embodiment, the invention is not limited thereto but may be modified in various ways. For example, three or more front door hold positions may be provided on the outside of the minimum opening angle θ1 or only one front door hold position may be provided on the outside of the minimum opening angle θ1.

In the aforementioned embodiment of the invention, the position of the minimum opening angle at which the door checker 9 holds the rear door 4 when the clamping parts 22 have reached the location of the first recesses 28*a* formed on the checker plate 20 of the door checker 9 closest to the support pin 19 is located slightly on the outside of the swing trajectory β of the rear end of the front door 2. This arrangement is advantageous in that it effectively prevents the front door 2 from interfering with the rear door 4 when the occupant opens and closes the front door 2 with the rear door 4 held at its minimum opening angle.

According to the embodiment, a rear door hold position where the door checker 9 holds the rear door 4 when the clamping parts 22 have reached the location of the second recesses 28*b* formed on the checker plate 20 is located at a position corresponding to the medium opening angle convenient for the rear seat occupant to get into and out of the vehicle. This arrangement permits the rear seat occupant to easily get into and out of the vehicle with the rear door 4 held at the medium opening angle. In addition, a rear door hold position where the door checker 9 holds the rear door 4 when the clamping parts 22 have reached the location of the large-diameter portion 29 formed near the extreme end of the checker plate 20 is located at a position corresponding to the maximum opening angle of the rear door 4. This is advantageous in that the luggage can be easily loaded into and unloaded from the vehicle interior with the rear door 4 opened up to the maximum opening angle.

Figure 9:
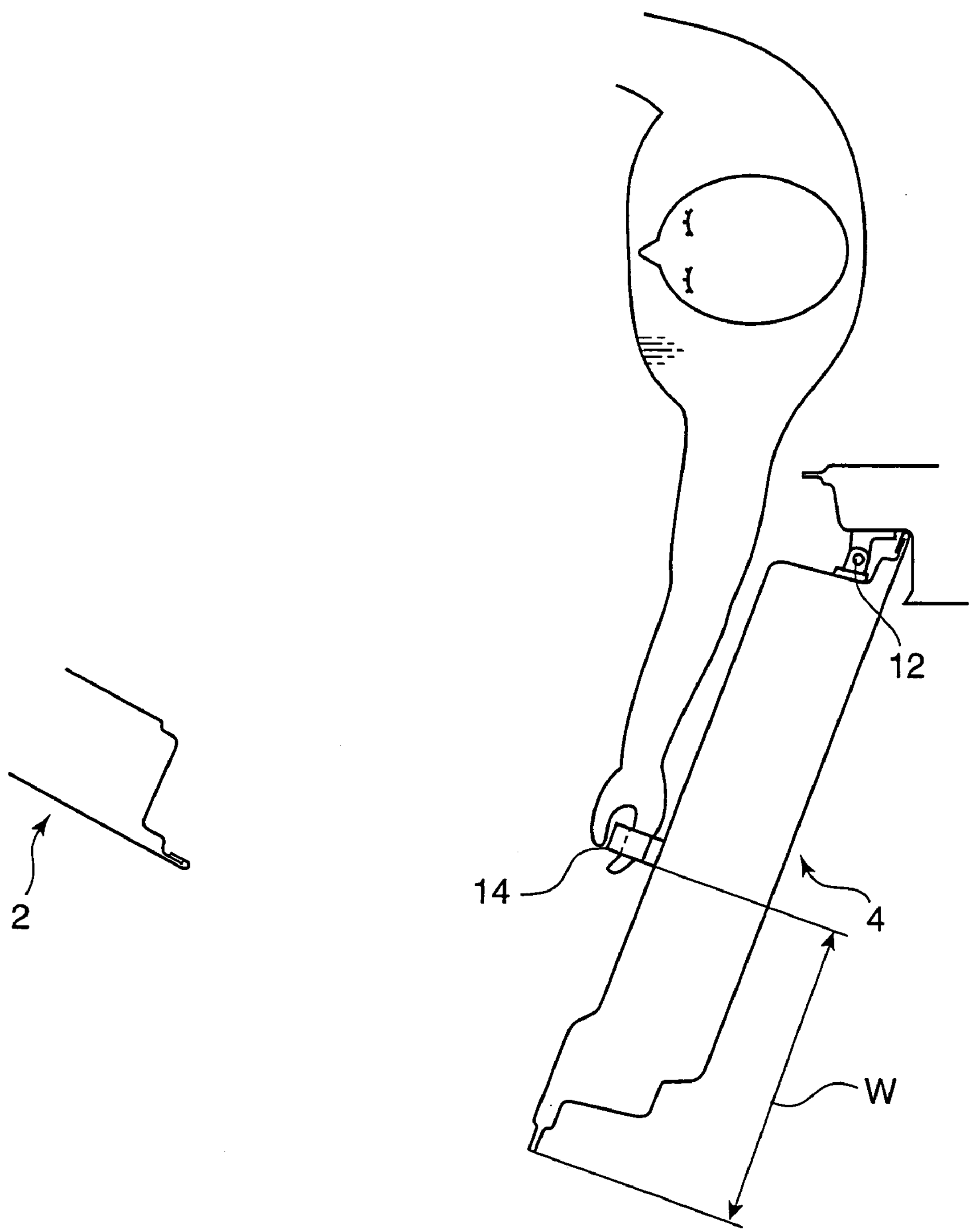
FIG. 9 is an explanatory diagram showing a state in which the rear door is opened to its maximum opening angle.
Figure 10:
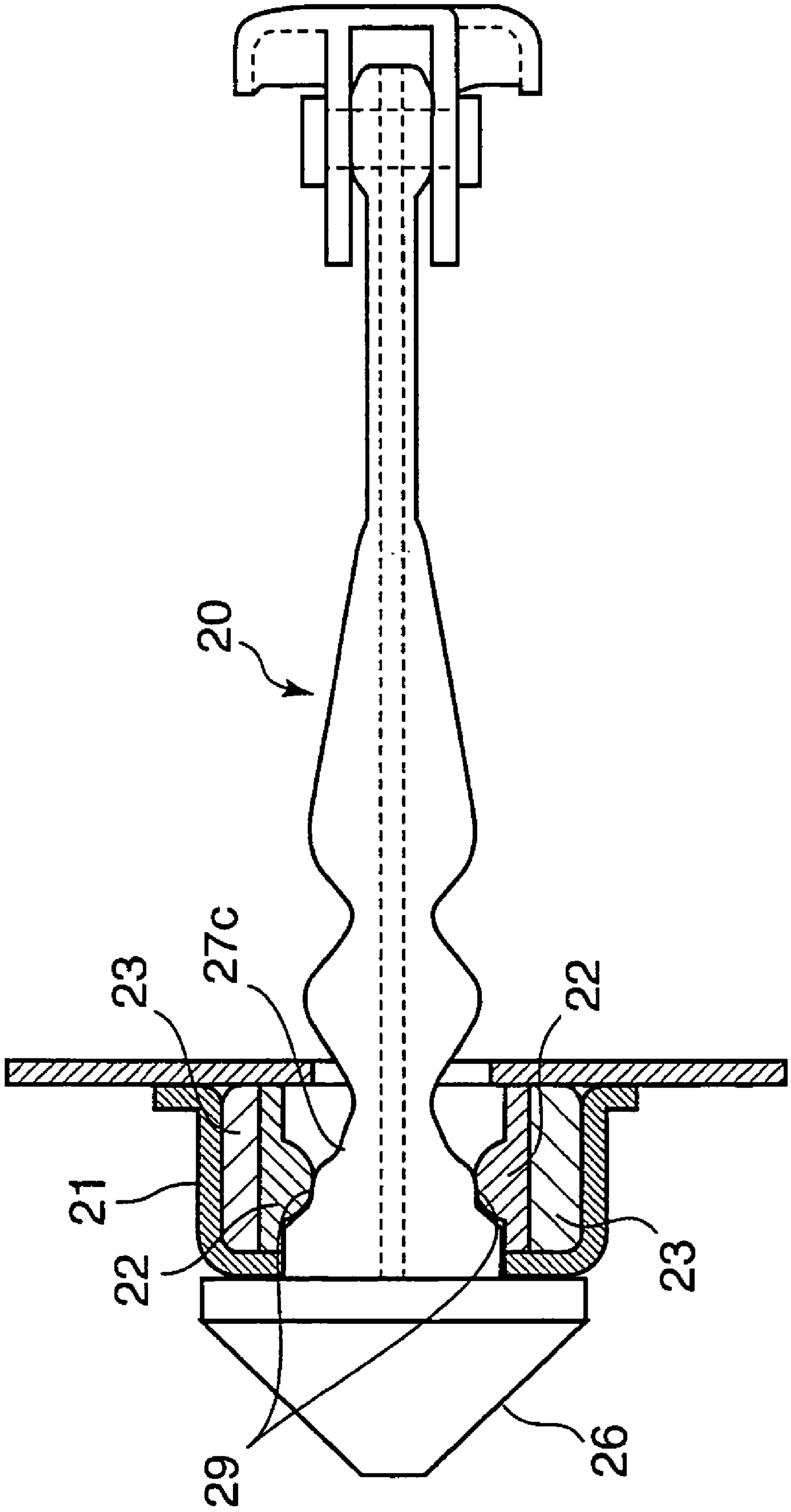
FIG. 10 is an explanatory diagram showing a state of the door checker for the rear door as it is opened to the maximum opening angle.

As illustrated in the foregoing discussion of the embodiment, there is formed the large-diameter portion 29 near the extreme end of the checker plate 20 of the door checker 9 for the rear door 4 and, when the rear door 4 has reached its maximum opening angle shown in FIG. 9, the clamping parts 22 contained in the holder 21 slide onto the large-diameter portion 29 of the checker plate 20 as shown in FIG. 10, whereby and the door checker 9 holds the rear door 4 at the maximum opening angle. This arrangement is advantageous in that the occupant can easily close the rear door 4 from its maximum opening angle.

More specifically, when the clamping parts 22 of the door checker 9 are situated on the large-diameter portion 29 as shown in FIG. 10, the elastic members 23 are compressed so much that a large amount of elastic strain energy is stored in the elastic members 23. Therefore, if the rear door 4 is moved from the maximum opening angle in its closing direction even by a small amount, the clamping parts 22 slide along sloping surfaces of the protuberances 27*c*, which widen toward the extreme end of the checker plate 20, thereby producing a large amount of assisting force to bias the rear door 4 in the closing direction. Therefore, the rear seat occupant can close the rear door 4 from its maximum opening angle relatively easily, although it is generally rather difficult for reasons related to the human physical structure for the rear seat occupant to apply a large force to the rear door 4 in its closing direction when closing it from the maximum opening angle by holding the inner door handle 14.

According to the embodiment, the inner door handle 14 used for opening and closing the rear door 4 is located a specific distance W to the rear of the vehicle body from the front end of the rear door 4. This arrangement is advantageous for the rear seat occupant when closing the rear door 4 from its maximum open position shown in FIG. 10. Specifically, the rear seat occupant can easily swing the rear door 4 from the open position to the closed position while holding the inner door handle 14 in a natural posture without the need to stretch the arm for gripping the inner door handle 14.

Also, the door checker 9 is located below the door hinges 3 swingably supporting the rear door 4 in the embodiment. This arrangement makes it possible to determine the location of the door checker 9 with a large degree of freedom, so that the door checker 9 can be installed at a proper position. Specifically, while a door checker is generally located between upper and lower door hinges fixed to the rear end of the rear door, this ordinary arrangement provides a considerably limited degree of freedom in the location of the door checker due to limitations in space available between the upper and lower door hinges. By comparison, a sufficient space is available below the door hinges 3, so that the arrangement of the embodiment makes it possible to install the door checker 9 with a sufficiently large degree of freedom in its location. Also, the checker plate 20 having an increased overall length, and thus having a large moving stroke, can be installed in the aforementioned space below the door hinges 3 of the rear door 4. This is advantageous in that the maximum opening angle of the rear door 4 restricted by the door checker 9 can be increased.

In this embodiment, the hinge pin 12 of each door hinge 3 affixed to the rear door 4 is inclined as viewed from the front of the vehicle so that the upper end of the hinge pin 12 is located slightly inward toward the center line of the vehicle body, and the hinge pin 12 of each door hinge 3 is inclined so that the upper end of the hinge pin 12 is located slightly to the rear of the vehicle body in side view. This arrangement is advantageous in that the rear door 4 can be opened with a small force while avoiding interference between the front end of the rear door 4 and the rear end of the front door 2 and held at an open position of a specific opening angle by means of the door checker 9 which exerts a small restraining force on the rear door 4.

Figure 11:
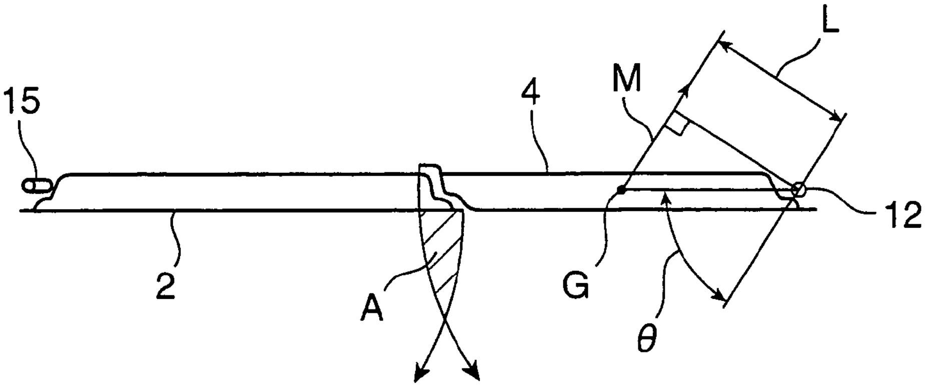
FIG. 11 is an explanatory diagram showing how the front door and the rear door swing when opened and closed.
Figure 12:
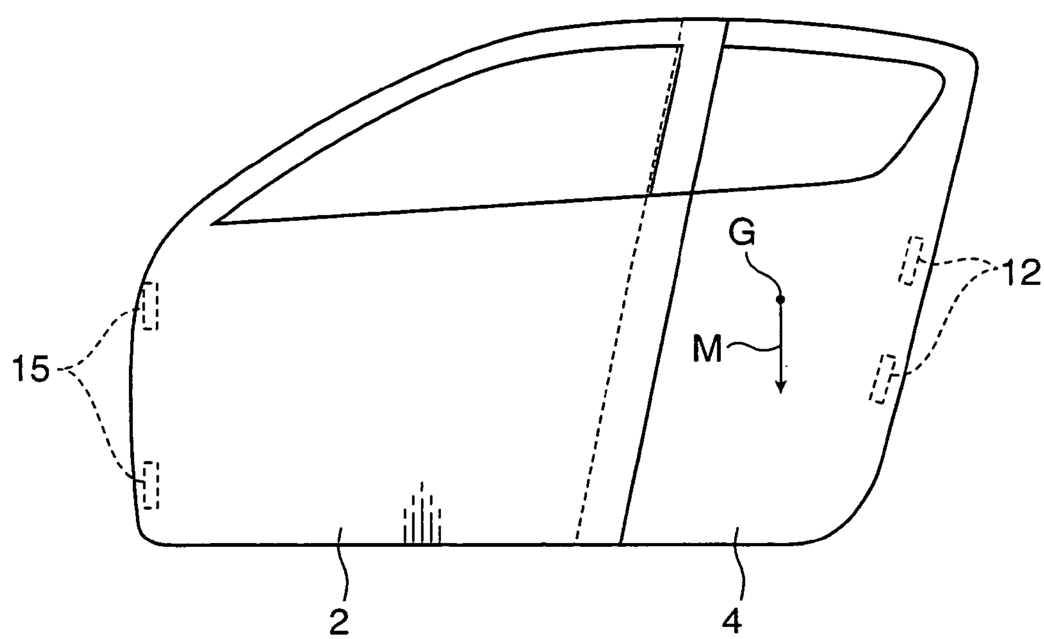
FIG. 12 is an explanatory side view of the front door and the rear door.
Figure 14:
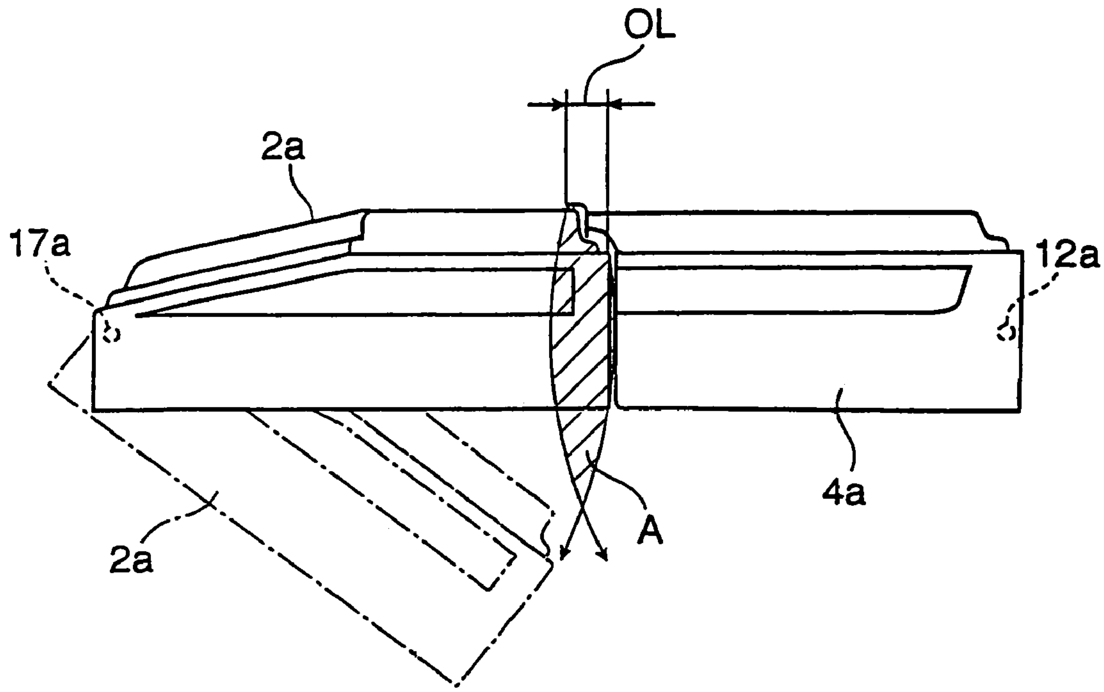
FIG. 14 is an explanatory diagram showing an example of a conventional side door structure of a vehicle.

Since the hinge pin 12 of each door hinge 3 of the rear door 4 is inclined such that the upper end of the hinge pin 12 is located slightly inward toward the center line of the vehicle body as stated above, it is possible to prevent an upper portion of the rear door 4 from being greatly shifted towards inward from the axis line 120 of the hinge pin 12. Also, when swinging the rear door 4 from the closed position to the open position about the hinge pins 12, it is possible to prevent the front end of the rear door 4 from shifting frontward too much. Compared to the earlier-mentioned example of the conventional side door structure shown in FIG. 14, in which the hinge pins 12*a* are mounted in a vertical position as viewed from the side of the vehicle, it is possible to significantly decrease an area "A" of overlap between the rear end of the front door 2 and the front end of the rear door 4 as viewed along an axial direction of the hinge pins 12 which are inclined as stated above, as shown in FIG. 11. This arrangement effectively prevents interference between the front door 2 and the rear door 4.

Also, since the hinge pin 12 of each door hinge 3 of the rear door 4 is inclined so that the upper end of the hinge pin 12 is located slightly to the rear of the vehicle body in side view, it is possible to reduce the length L of an arm of moment acting on the rear door 4 in its closing direction about the axis line 120 of the hinge pins 12 passing through the center of gravity G of the rear door 4 due to its own weight M, compared to a case where the hinge pin 12 of each door hinge 3 is vertically mounted in side view. This makes it possible to effectively reduce a swinging force needed in an initial stage of opening the rear door 4. Moreover, since the moment acting on the rear door 4 in its closing direction becomes zero at a point where the rear door 4 is opened to a specific angle θ which is smaller than 90 degrees and an acting direction of the weight M of the rear door 4 matches a direction of inclination of the hinge pin 12 of each door hinge 3 as shown in FIG. 11, it is also possible to effectively reduce a swinging force needed in a final stage of opening the rear door 4. While the own weight M of the rear door 4 passing through its center of gravity G acts in a vertical direction, a line showing the direction in which the weight M of the rear door 4 acts is inclined as illustrated in FIG. 11. This is because FIG. 11 shows the side door structure as viewed along the axial direction of the hinge pins 12, that is, as if cut by a plane intersecting the axis line 120 of the hinge pins 12 at right angles thereto.

When the door checker 9 is located more inward toward the center line of the vehicle body than the hinge pins 12 which are inclined such that their upper ends are located slightly inward toward the center line of the vehicle body as shown in FIG. 3, the axis line 120 of the hinge pins 12 is offset so much from the location of the door checker 9 that a sufficient distance S can be ensured between the locations of the hinge pins 12 and the location of the door checker 9 as viewed along the axis line 120. It is therefore possible to obtain a large resisting moment which is given as the product of the restraining force exerted by the door checker 9 when the rear door 4 is opened or closed and the aforementioned distance S. Consequently, the door checker 9 can hold the rear door 4 at specific opening angles in a stable fashion even when the restraining force exerted by the door checker 9 is small.

Figure 13:
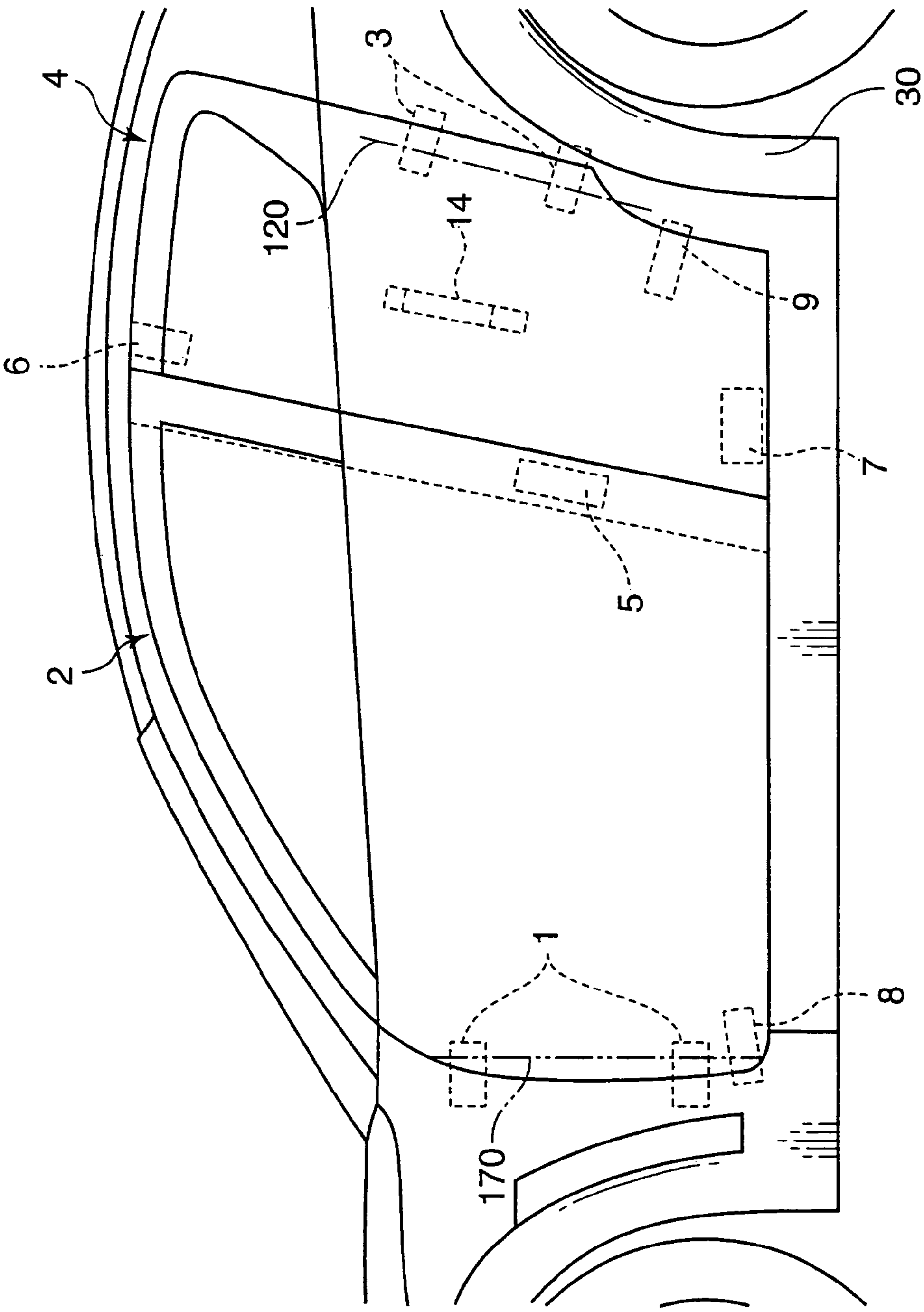
FIG. 13 is a side view particularly showing an alternative rear door structure in one varied form of the embodiment.

FIG. 13 is a side view showing an alternative side door structure in one varied form of the foregoing embodiment. This variation of the embodiment, applied to a vehicle in which rear doors 4 are located at the front of wheel arches (curved exterior portions of left and right tire houses) 30 for rear wheels, is constructed such that a door checker 9 for each rear door 4 is located at a position offset frontward from the locations of hinge pins 12 of door hinges 3. This structure is advantageous in that the door checker 9 can be installed at a proper position and effectively produce a specific resisting moment during the opening of the rear door 4 while avoiding interference between the wheel arch 30 and the door checker 9.

In summary, a side door structure of the invention is applicable to a vehicle of which side openings are covered by a front door swingably supported by a door hinge located at the front of the front door and by a rear door swingably supported by a door hinge located at the rear of the rear door. The side door structure includes a door checker for holding the front door at an open position situated on the outside of but close to a swing trajectory of the rear door.

The door checker of this side door structure holds the front door at the open position situated slightly on the outside of the swing trajectory of the rear door. This structure effectively prevents a front end of the rear door from interfering with a rear end of the front door when an occupant opens the rear door.

According to one feature of the invention, the side door structure may be such that the door checker can hold the front door at multiple open positions, and the open position where the front door is held at a minimum opening angle is situated on the outside of but close to the swing trajectory of the rear door.

As the side door structure thus configured can hold the front door at the open position of the aforementioned minimum opening angle situated slightly on the outside of the swing trajectory of the rear door, it is possible to effectively prevent the front end of the rear door from interfering with the rear end of the front door when the occupant opens the rear door.

According to another feature of the invention, the side door structure may be such that the door checker can hold the front door at least at two open positions situated at opening angles larger than the minimum opening angle.

As the side door structure thus configured can hold the front door at the open position of the aforementioned minimum opening angle, it is possible to effectively prevent the front end of the rear door from interfering with the rear end of the front door when the occupant opens the rear door. In addition, since the side door structure can hold the front door at the opening angles larger than the minimum opening angle, a front seat occupant can easily get into and out of the vehicle and luggage can be easily loaded into and unloaded from the vehicle interior.

According to still another feature of the invention, the side door structure further includes a door checker for holding the rear door at an open position situated on the outside of but close to a swing trajectory of the front door.

The door checker for the rear door of this side door structure holds the rear door at the open position situated slightly on the outside of the swing trajectory of the front door. This structure effectively prevents the rear end of the front door from interfering with the front end of the rear door when the occupant opens the front door.

Overall, the door checker for the front door holds it at the aforementioned open position situated slightly on the outside of the swing trajectory of the rear door before the occupant opens the rear door. Thus, the side door structure of the invention enables the occupant to open the rear door with ease and safety without causing the front end of the rear door to interfere with the rear end of the front door.

This application is based on Japanese patent application serial no. 2002-321644, filed in Japan Patent Office on Nov. 5, 2002, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A side door structure of a vehicle of which side openings are covered by a front door swingably supported by a door hinge located at the front of the front door and by a rear door swingably supported by a door hinge located at the rear of the rear door, said side door structure comprising:

a front door checker for holding the front door at an open position situated on the outside of but close to a swing trajectory of the rear door, wherein said front door checker can hold the front door at multiple open positions: the front door, when held at a minimum opening position among said multiple open positions is situated on the outside of the swing trajectory of the rear door so that said rear door can be freely openable without interfering with the rear end of the front door when the front door is held at said minimum opening position.

2. The side door structure according to claim 1, wherein the front door checker can hold the front door at least at two open positions situated at opening angles larger than the minimum opening angle.

3. The side door structure according to claim 1, further comprising:

a rear door checker for holding the rear door at an open position situated on the outside of but close to a swing trajectory of the front door.

* * * * *